T. J. Sloan.
Door Knob.
Nº 96,627.     Patented Nov. 9, 1869.

Witnesses;

Inventor;

UNITED STATES PATENT OFFICE.

THOMAS J. SLOAN, OF BRONXVILLE, NEW YORK.

IMPROVED DOOR-KNOB.

Specification forming part of Letters Patent No. 96,627, dated November 9, 1869; antedated October 30, 1869.

*To all whom it may concern:*

Be it known that I, THOMAS J. SLOAN, of Bronxville, in the county of Westchester and State of New York, have invented and made a new and useful Improvement in Door-Knobs; and I do hereby declare the following to be a full, clear, and exact description of the said invention, reference being had to the annexed drawings, making part of this specification, wherein—

Figure 1:
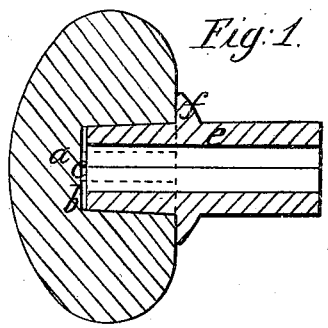
Figure 2:
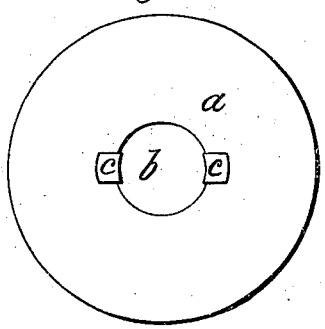
Figure 4:
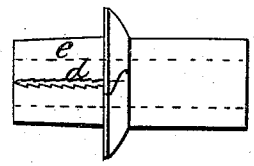
Figure 3:
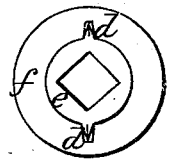
Figure 5:
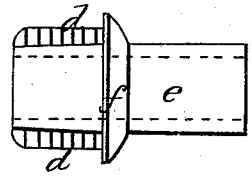

Figure 1 is a section of the knob and shank. Fig. 2 represents the inner side of the knob. Fig. 3 is an end view of the shank, and Figs. 4 and 5 are side views of the shank.

Similar marks of reference denote the same parts.

This invention has for its object the attachment of porcelain or vitrified knobs to the metal shanks that receive the latch-spindle.

This invention consists of a vitrified knob with grooves in the sides of the cavity for the shank, into which grooves wooden dowels are inserted, in combination with serrated fins that are formed on the sides of the metal shank and driven into the wooden dowels as the metal shank is forced into the cavity of the vitrified knob. By this means the metal shank is held firmly within the knob, so that there cannot be any looseness in the parts, the wooden dowels being compressed by the metal shank and the serrations of the pins effectually prevent the knob being pulled off the shank.

In the drawing, $a$ represents the vitrified knob; $b$, its cavity or socket, in the sides of which are grooves receiving the wooden dowels $c\ c$.

$d\ d$ are the serrated fins on the sides of the metal shank $e$. This shank $e$ has the polygonal hole or socket for the latch-spindle, also the collar $f$ to set against the inner face of the knob. The serrations of the fins $d$ are to be inclined backwardly, so that the fins can be easily driven into the dowels $c$ as the shank is forced into its socket $b$; but said serrations effectually prevent the knob being drawn off the shank.

What I claim, and desire to secure by Letters Patent, is—

The shank $e$, with the serrated fins $d\ d$, in combination with the vitrified knob $a$, cavity $b$, and dowels $c\ c$, substantially as and for the purposes set forth.

In witness whereof I have hereunto set my signature this 31st day of March, A. D. 1869.

THOS. J. SLOAN.

Witnesses:
    CHAS. H. SMITH,
    GEO. F. PINCKNEY.